June 9, 1953  P. M. McKENNA  2,641,682
INDUCTION HEATING UNIT
Filed April 4, 1949
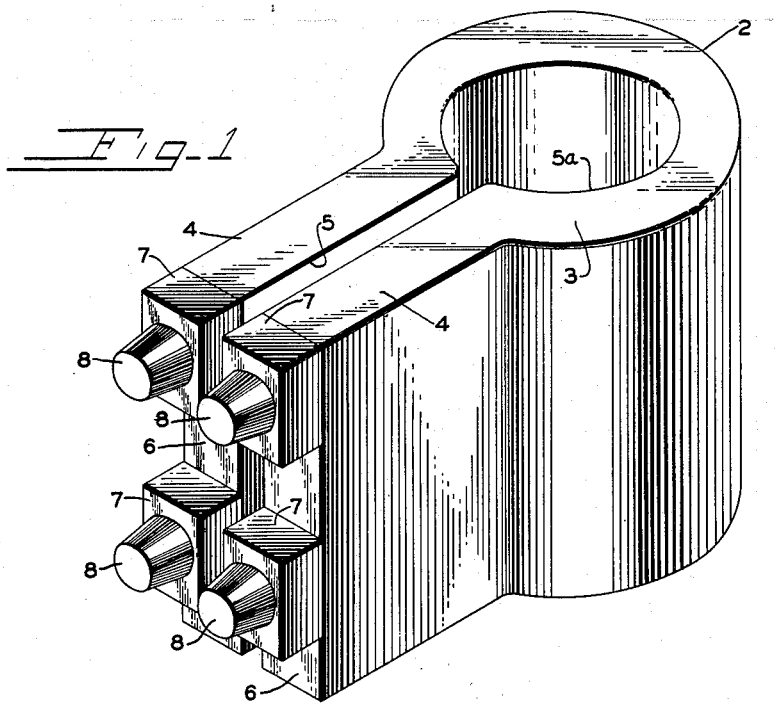
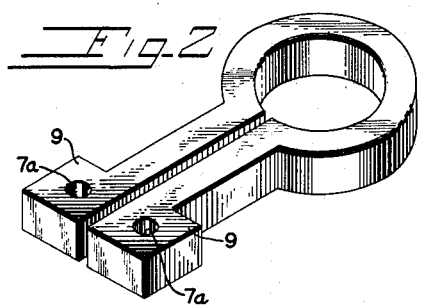
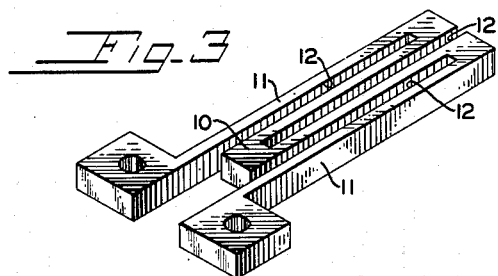
INVENTOR.
PHILIP M. McKENNA
BY
Clarence B. Desjardins
HIS ATTORNEY Patented June 9, 1953

2,641,682

UNITED STATES PATENT OFFICE 2,641,682

INDUCTION HEATING UNIT

Philip M. McKenna, Greensburg, Pa., assignor to Kennametal Inc., Latrobe, Pa., a corporation of Pennsylvania Application April 4, 1949, Serial No. 85,391

6 Claims. (Cl. 219—47)

This invention relates to induction heating units, and it pertains particularly to induction heating units which are fabricated from a cemented or sintered hard metal composition, consisting essentially of titanium carbide, that is resistant to corrosion at the high temperatures to which the units are subjected in being connected by suitable terminals to a high-frequency electrical current.

Materials heretofore used for fabricating these induction heating units have not been of a kind which in and of themselves could withstand the high temperatures to which they ordinarily are subjected in use without corroding and disintegrating. Because of the inability of the heating units to withstand the high temperatures, it has been necessary to cool them in some way, such as by forming a chamber therein through which water is circulated. Water cooling dissipates from the heating units and the heat-treated objects much of the heat which could be effectively retained for more efficiently heating the objects being heat treated if the heating units were of a character to withstand the high temperatures to which they are subjected without being cooled. Naturally, there is a great loss of heat resulting from cooling the units for enabling them to withstand the high-heating conditions.

One of the objects of my invention is to fabricate the heating units from corrosion-resistant cemented hard metal compositions.

Another object of the invention is to make the induction heating units of cemented hard metal composition which in and of itself is corrosion resistant at high temperatures.

Another object of the invention is to make induction heating units which are of a cemented hard metal composition to be strong and durable at high temperatures without being cooled.

Further objects, and objects relating to details of construction and economies of operation, will definitely appear from the detailed description to follow. The invention is clearly defined and pointed out in the appended claims. Structures, constituting embodiments of the invention, are illustrated in the accompanying drawings, forming a part of this specification, in which:

Figs. 1 to 3, inclusive, are perspective views of three different induction heating units embodying the invention.

The induction heating units may be of any construction having an elongated body between opposite free end terminals which are provided with suitable contacting points for being connected to the copper leads of an electrical power supply, that may be any suitable high frequency converter supplying power at one thousand to one million cycles through said leads to the heating unit. The copper leads may be water cooled or not, as desired. There are two leads from the power supply, one for each free end, or terminal, of the induction heater unit, but there may be one large, or a plurality of small, contact points on each free end, or terminal, of the unit for being connected with each of these leads. The contact point, or points, may be of the same material as that of the heating units and integral therewith, or they may be made of different material and secured to the free ends, or terminals, of the units, such as by welding. The units may be formed from any elongated strip, shaped to form two legs, with an intervening space provided therebetween and open at one end, the opposite end being closed. The space between the legs may be of any desired conformation suitable for receiving therein those objects which are to be heat treated, such as percussion drill bits and various other articles. The intermediate portion of the strip between its opposite ends can be tenuous or serpentine to provide a plurality of spaces with open and closed ends, the open and closed ends being alternately disposed.

The induction heater coils are fabricated from a cemented or sintered hard metal composition composed of titanium carbide (TiC) and some metal of the iron group, such as iron, nickel or cobalt, or a combination of them, as an auxiliary or cementing metal. That is to say, the cementing material used in making this sintered composition may be metal of the iron group. The titanium carbide comprises, by weight, a predominant proportion, and the metal a subordinate proportion of the combination. The composition may be formed entirely from these components and preferably comprises about 80% titanium carbide and about 20% cobalt, nickel or iron, or any combination of the cementing metals. A cemented or sintered hard metal composition made from titanium carbide and cobalt, and in these proportions, has a specific gravity of about 5.53, a hardness of about 90.9 on the Rockwell A scale, and a transverse rupture strength of about 178,560 pounds per square inch at room temperature. The electrical conductivity of the composition is about 5% that of copper standard, and, therefore, is sufficiently highly resistant to electricity that it can be electrically heated to high temperatures. More important still, the composition does not need to be water cooled for withstanding high temperatures without corroding and disintegrating.

The titanium carbide is one preferably having a substantially uniform carbon content and free from free titanium, free carbon or oxides of titanium and nitrides of titanium. The usual method of making titanium carbide is to heat titanium oxide with carbon which results in the reduction of the oxide metallic titanium and the carburizing of this metallic titanium. The titanium carbide used is preferably that produced by the method described and claimed in application Serial No. 15,962, filed March 19, 1948, and entitled Process for Making Titanium Carbide, issued on July 18, 1950, as Patent No. 2,515,463.

There may be included in the composition a proportion of tantalum carbide (TaC) or columbium carbide (CbC), or both, or a multicarbide of columbium-tantalum-titanium carbide, referred to as Cb(TaTi)C. Where this latter component is added to the composition the proportions by weight, of the components are preferably in the following ranges:

| | Per cent |
|---|---|
| TiC | 40 to 80 |
| Cb(TaTi)C | 5 to 50 |
| Co | 15 to 20 |

The preferred portion of the Cb(TaTi)C is about 15%. The TiC, with the Cb(TaTi)C included in the composition, preferably comprises the major proportion of the composition, and should not be less than 40%. It and the Cb(TaTi)C will comprise the major proportion of the composition, the cobalt, iron or nickel comprising the subordinate proportion. Inclusion of the Cb(TaTi)C in the composition provides for greater resistance to corrosion and oxidation at high temperatures.

Referring specifically to the drawings, in which like parts are designated by like numerals, numeral 2 (Fig. 1) designates generally an induction heating unit comprising a strip having an intermediate tubular portion 3 with the opposite longitudinal margins of said portion terminating to form legs 4, spaced apart at 5, having free ends 6. The tubular portion has a bore 5a, merging with space 5, in which objects to be heat treated may be placed and surrounded by the wall of the tube. The free ends of the legs are each provided with one or more contacts, these being formed out of the same material as the induction coils or from other material attached thereto. In the embodiment of Fig. 1, the contacts 7, with bosses 8 integrally formed therewith, are formed from other material than the induction unit, and are fastened to each end of the legs of the induction unit by suitable means, such as welding. This other material for the contacts is any that will permit same to be brazed to the copper leads, without special treatment, for the power supply. Since the cemented or sintered titanium carbide composition cannot be brazed to the copper leads without special treatment, the contacts 7 are formed of suitable material that can be brazed. One or a plurality of contacts may be provided for each power supply lead, there being one lead for each leg of the coil, and the lead is connected to the one, or more, contacts on the leg. In the embodiment of Fig. 1, there are two contacts for each leg, each being provided with a boss, and these contacts are fixed to the end edges of the free ends of the legs.

The embodiment in Fig. 2 is of the same general construction as that in Fig. 1, except that it is of much less thickness, and the free ends of the legs are widened at 9 to provide a greater area for the contact holes 7a. The contacts in this embodiment are holes formed in the cemented titanium carbide composition.

The embodiment in Fig. 3 has a tenuous body 10, between two legs 11, disposed to provide a plurality of narrow spaces or slots 12 with open and closed ends, these ends being alternately disposed on opposite sides of the induction coil. The spaces or slots are of any shape suitable to receive the objects to be inserted therein for being heat treated.

The above-described induction heating units are illustrative of different structures which are adapted to be heated to high temperatures, and by fabricating these units with the cemented or sintered titanium carbide composition they are able to withstand the high temperatures without corroding and disintegrating, and do not need to be specially constructed for being water cooled.

The heating unit comprises a solid bar which is essentially of sintered titanium carbide with sufficient metal of the iron group incorporated therein to cement the titanium carbide. Some other carbide, such as tantalum carbide and/or columbium carbide, or multicarbide, may be included with the titanium carbide. The proportions of the carbides, if other carbides be used, may vary widely, but the titanium carbide preferably equals or exceeds the amount of any other carbides that are included in the composition.

I am aware that the structures and compositions herein described are susceptible of considerable variation without departing from the spirit of my invention, and, therefore, I claim my invention broadly as indicated by the appended claims.

Having thus described my invention, what I claim as new and useful, and desire to secure by United States Letters Patent, is:

1. An induction electrical heating coil comprising a solid bar of sintered hard metal composition consisting essentially of titanium carbide and an auxiliary metal of the iron group, continuous in cross section, said bar having a main tubular portion forming a coil between end portions, and said end portions being provided with terminals for connection to a source of high-frequency electrical current, the composition of the metal bar consisting, by weight, of about 40 to 80% titanium carbide, 5 to 50% columbium-tantalum-titanium carbide, and 15 to 20% auxiliary metal of the iron group.

2. An induction electrical heating coil as set forth in claim 1 in which the proportion of the columbium-tantalum-titanium carbide component is from 5 to 50%.

3. An induction electrical heating coil comprising a solid bar of sintered hard metal composition, continuous in cross section and having a main tubular portion forming a coil between end portions, said end portions being provided with terminals for connection to a source of high-frequency electrical current, the metal composition of the bar consisting, by weight, of about 65% titanium carbide, 15% columbium-tantalum-titanium carbide and 20% auxiliary metal of the iron group.

4. An induction electrical heating coil comprising an elongated bar formed into a tubular wall encompassing a heat treating space and having its opposite ends disposed for being connected to a source of high frequency electrical current, said bar being formed of sintered hard metal composition consisting essentially of titanium carbide, columbium-tantalum-titanium carbide and an auxiliary metal of the iron group, and terminals attached to the opposite ends of the bar, the proportion of the hard carbide composition being not substantially more than 65% titanium carbide, 15% columbium-tantalum-titanium carbide, and 20% auxiliary metal of the iron group.

5. An induction electrical heating coil formed from a bar of sintered hard metal, the composition of the bar consisting, by weight, of 40 to 80% of titanium carbide, 5 to 50% of columbium-tantalum-titanium carbide, and 15 to 20% of auxiliary metal of the iron group, said bar having a main intermediate coiled portion encompassing a heating space between its opposite ends which are disposed for being connected to a source of high frequency electrical current.

6. An induction electrical heating coil comprising an elongated solid bar with the intermediate portion between its opposite ends coiled into a wall encompassing a heat treating space and its said opposite ends disposed in closely adjacent relation, said bar being formed from a sintered hard metal composition consisting of a major proportion of titanium carbide, including some columbium-tantalum-titanium carbide, and a subordinate proportion of auxiliary metal of the iron group, and electrical terminals attached to the opposite ends of said bar.

PHILIP M. McKENNA.

References Cited in the file of this patent

UNITED STATES PATENTS

| Number | Name | Date |
|---|---|---|
| 905,557 | Monasch | Dec. 1, 1908 |
| 1,246,165 | Ruzicka | Nov. 13, 1917 |
| 1,322,416 | Fossati | Nov. 18, 1919 |
| 1,551,766 | Northrup | Sept. 1, 1925 |
| 1,910,532 | Fetkenheuer | May 23, 1933 |
| 1,982,857 | Comstock | Dec. 4, 1934 |
| 1,997,741 | Northrup | Apr. 16, 1935 |
| 2,015,536 | Schroter | Sept. 24, 1935 |
| 2,023,413 | Fetkenheuer | Dec. 10, 1935 |
| 2,181,899 | Kennedy | Dec. 5, 1939 |
| 2,206,792 | Stalhane | July 2, 1940 |
| 2,294,413 | Marshall | Sept. 1, 1942 |
| 2,295,777 | Denneen et al. | Sept. 15, 1942 |
| 2,412,373 | Wejnarth | Dec. 10, 1946 |
| 2,439,570 | Hensel et al. | Apr. 13, 1948 |

FOREIGN PATENTS

| Number | Country | Date |
|---|---|---|
| 406,633 | Great Britain | May 21, 1932 |